C. S. FRANKLIN.
MEANS FOR CONTROLLING THE SPEED OF A MACHINE.
APPLICATION FILED APR. 7, 1916.
1,284,885.
Patented Nov. 12, 1918.
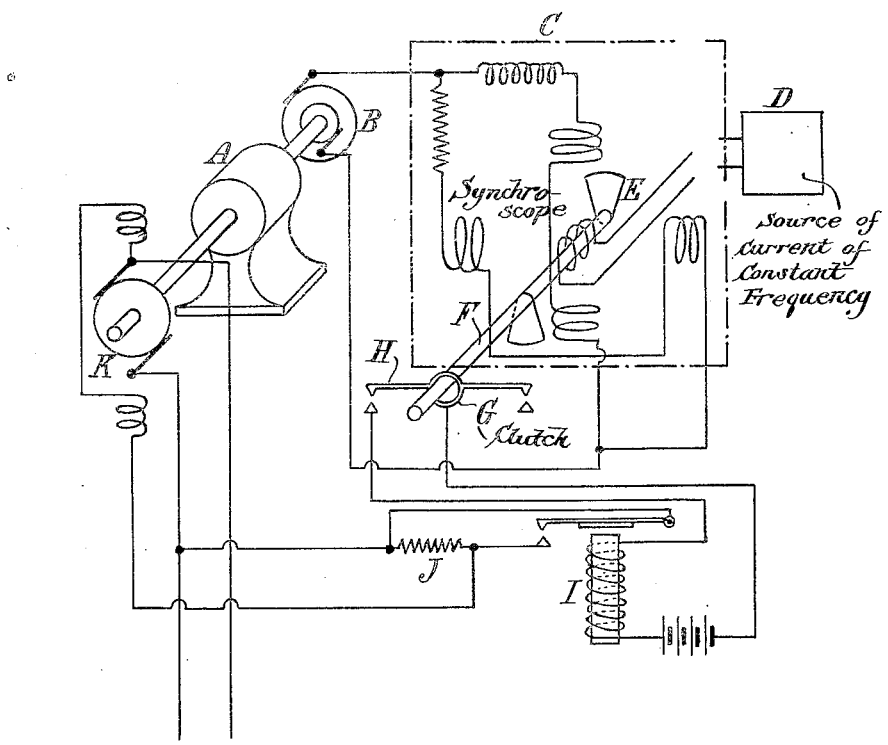
INVENTOR
Charles Samuel Franklin
by Sheffield & Betts
his attorneys

UNITED STATES PATENT OFFICE.

CHARLES SAMUEL FRANKLIN, OF LONDON, ENGLAND, ASSIGNOR TO MARCONI WIRELESS TELEGRAPH COMPANY OF AMERICA, OF NEW YORK, N. Y., A CORPORATION OF NEW JERSEY.

MEANS FOR CONTROLLING THE SPEED OF A MACHINE.

1,284,885.  Specification of Letters Patent.  Patented Nov. 12, 1918.

Application filed April 7, 1916. Serial No. 89,553.

*To all whom it may concern:*

Be it known that I, CHARLES SAMUEL FRANKLIN, a subject of the King of Great Britain, residing at Marconi House, Strand, London, England, have invented new and useful Improved Means for Controlling the Speed of a Machine, of which the following is a specification.

The object of this invention is to provide improved means for controlling and keeping constant the speed of any machine which it is desired to run at a particular speed.

A synchroscope is employed of a form commonly used for indicating when two alternators are in synchronism and comprising two independent windings, which can be connected respectively to the two alternators, and a moving member which rotates with a speed equal to the difference of the frequencies of the currents supplied to the two windings.

According to this invention one of the windings of such a synchroscope is connected to an alternator driven, preferably directly, by the machine to be controlled, or to the machine itself if it be an alternator, and the other to an independent source of alternating current of small power and constant frequency which frequency is that of the alternator driven by the machine when the latter is running at the correct speed. Thus, when the speed of the machine is correct, the moving member of the synchroscope will remain stationary; if, however, the speed is incorrect to no matter how small a degree, the moving member of the synchroscope will rotate in one or other direction according as the speed is too high or too low. The moving member of the synchroscope is arranged to drive through some suitable form of friction clutch an arm adapted, when it has moved through a certain angle, to contact with terminals included in circuits which control the motor driving the machine, decreasing or increasing the power according as the speed is high or low respectively.

The independent source of alternating current mentioned must obviously be of very constant frequency. It is found that a vacuum valve is a very suitable generator for this purpose, but other known means for producing alternating currents of small power and constant frequency may be employed.

This invention is illustrated in the accompanying diagram.

A is the machine to be controlled; it is coupled to an alternator B which is connected in one of the windings of a synchroscope C. This instrument is of known construction and is therefore indicated only diagrammatically. D is a source of alternating current of very constant frequency and is connected to the coil of the synchroscope which surrounds the rotor E. The spindle F of this rotor is connected by a clutch such as a friction ring G to an arm H so arranged that when the spindle F rotates in one direction (anticlockwise as shown in the diagram) it closes an electric circuit through a magnet I; when this magnet is energized, it short circuits a resistance J in the field circuit of a motor K driving the machine A. Supposing that the machine A begins to run too fast, the frequency of the alternator B will exceed that of D and the rotor E will therefore rotate with a speed varying with the difference of the frequencies of B and D, let us say anticlockwise, the arm H will therefore be held in a position in which it closes the circuit through the magnet I, the resistance J will therefore be short-circuited and the motor K will slow down. Similarly if A runs too slow, the arm H will turn in the other direction, the resistance J will be put into the field circuit and the motor will be accelerated.

While I have shown and described the preferred embodiment of my invention, I do not wish to be limited thereto, since numerous changes will suggest themselves to those skilled in this art within the spirit of my invention.

What I claim is:—

1. The combination with an alternator of a source of alternating current of constant frequency, a synchroscope connected to the alternator and to the source of current, and means controlled by the synchroscope for regulating the speed of the alternator.

2. The combination with an alternator of a source of alternating current of constant frequency, a synchroscope connected to the alternator and to the source of current, a motor adapted to rotate the alternator, an arm adapted to control the speed of the motor, and a clutch adapted to connect the arm to the synchroscope.

3. The combination with an alternator of a source of alternating current of constant frequency, a synchroscope connected to the alternator and to the source of current, an electric motor adapted to rotate the alternator, an electromagnet adapted to control the speed of said motor, an arm adapted to control the magnet, and a clutch adapted to connect the arm to the synchroscope.

CHARLES SAMUEL FRANKLIN.